US010795356B2

(12) United States Patent
Nix et al.

(10) Patent No.: US 10,795,356 B2
(45) Date of Patent: Oct. 6, 2020

(54) SYSTEMS AND METHODS FOR DETERMINING WHEN TO RELEASE CONTROL OF AN AUTONOMOUS VEHICLE

(71) Applicant: UATC, LLC, San Francisco, CA (US)

(72) Inventors: Molly Castle Nix, San Francisco, CA (US); Sean Chin, Pittsburgh, PA (US); Dennis Zhao, Pittsburgh, PA (US); Eric J. Hanson, San Francisco, CA (US); Scott C. Poeppel, Pittsburgh, PA (US); Sean Hyde, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 134 days.

(21) Appl. No.: 15/724,728

(22) Filed: Oct. 4, 2017

(65) Prior Publication Data
US 2019/0064806 A1 Feb. 28, 2019

Related U.S. Application Data

(60) Provisional application No. 62/552,558, filed on Aug. 31, 2017.

(51) Int. Cl.
G05D 1/00 (2006.01)
G05D 1/02 (2020.01)
G06Q 50/28 (2012.01)
B60W 30/182 (2020.01)
B60W 50/00 (2006.01)
G06Q 50/30 (2012.01)

(52) U.S. Cl.
CPC ......... G05D 1/0061 (2013.01); B60W 30/182 (2013.01); B60W 50/00 (2013.01); G05D 1/0055 (2013.01); G05D 1/0202 (2013.01); G05D 1/0212 (2013.01); G06Q 50/28 (2013.01); G06Q 50/30 (2013.01); G05D 2201/0212 (2013.01)

(58) Field of Classification Search
CPC .. B60W 30/182; B60W 50/00; B60W 60/005; B60W 60/0051; B60W 60/0053; G05D 1/0055; G05D 1/0061; G05D 1/0202; G05D 1/0212; G05D 2201/0212; G06Q 50/28; G06Q 50/30
USPC .......................................... 701/25
See application file for complete search history.

(56) References Cited

U.S. PATENT DOCUMENTS 9,783,202 B2 * 10/2017 Yamada ................ B60W 50/08
9,989,963 B2 *  6/2018 Perkins ................ G05D 1/0248
(Continued)

FOREIGN PATENT DOCUMENTS

EP          2940545         11/2015

OTHER PUBLICATIONS

PCT International Search Report and Written Opinion or PCT/US2018/048098, dated Nov. 26, 2018, 12 pages.

Primary Examiner — Angelina Shudy
(74) Attorney, Agent, or Firm — Dority & Manning, PA

(57) ABSTRACT

Systems and methods for controlling an autonomous vehicle are provided. In one example embodiment, a computer-implemented method includes providing a control of the autonomous vehicle to a user associated with a vehicle service. The method includes identifying one or more release signals indicative of one or more actions of the user. The method includes releasing the control of the autonomous vehicle from the user, based at least in part on the release signals.

22 Claims, 14 Drawing Sheets

(56) References Cited

U.S. PATENT DOCUMENTS

| | | | |
|---|---|---|---|
| 2014/0132082 A1* | 5/2014 | McGinn | G05D 1/0061 |
| | | | 307/125 |
| 2014/0358353 A1 | 12/2014 | Ibanez-Guzman et al. | |
| 2016/0357186 A1* | 12/2016 | Dias | G05D 1/0061 |
| 2016/0375911 A1* | 12/2016 | Coelingh | B60W 50/14 |
| | | | 701/23 |
| 2017/0038774 A1* | 2/2017 | Ebina | B60W 50/14 |
| 2017/0097640 A1* | 4/2017 | Wang | G06N 7/005 |
| 2017/0102700 A1 | 4/2017 | Kozak | |
| 2017/0106876 A1 | 4/2017 | Gordon et al. | |
| 2017/0227959 A1 | 8/2017 | Lauffer et al. | |
| 2017/0248951 A1* | 8/2017 | Perkins | G05D 1/0248 |
| 2017/0297586 A1* | 10/2017 | Li | G05D 1/0088 |
| 2018/0061242 A1* | 3/2018 | Bavar | B60W 50/082 |
| 2018/0118219 A1* | 5/2018 | Hiei | B60W 40/09 |
| 2018/0164808 A1* | 6/2018 | Prokhorov | B60W 50/08 |
| 2018/0181122 A1* | 6/2018 | Kadoya | B60K 37/06 |
| 2018/0196427 A1* | 7/2018 | Majumdar | B60W 50/14 |
| 2018/0257682 A1* | 9/2018 | Brooks | B61L 3/006 |
| 2018/0322775 A1* | 11/2018 | Chase | G05D 1/0027 |
| 2018/0326997 A1* | 11/2018 | Sweeney | G01C 21/343 |
| 2019/0072974 A1* | 3/2019 | Hwang | B60W 50/14 |
| 2019/0079518 A1* | 3/2019 | Arakawa | B60W 60/0025 |
| 2019/0184898 A1* | 6/2019 | Zheng | B60Q 9/00 |
| 2019/0184998 A1* | 6/2019 | Zheng | B60W 30/182 |
| 2019/0186947 A1* | 6/2019 | Rockmore | G01C 21/3697 |
| 2019/0187701 A1* | 6/2019 | Zheng | G05D 1/0061 |
| 2019/0202467 A1* | 7/2019 | Sun | B60W 50/082 |

* cited by examiner

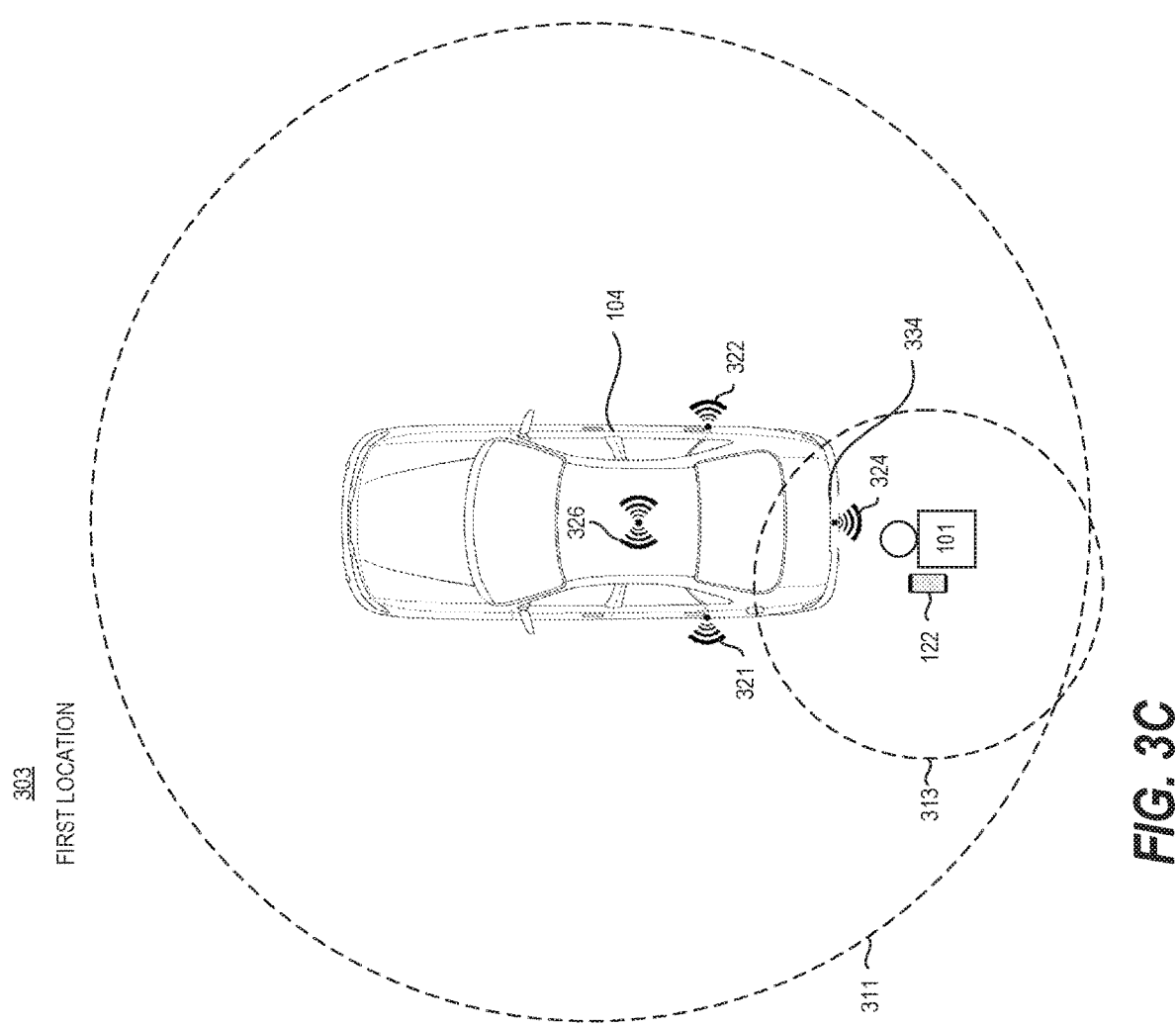

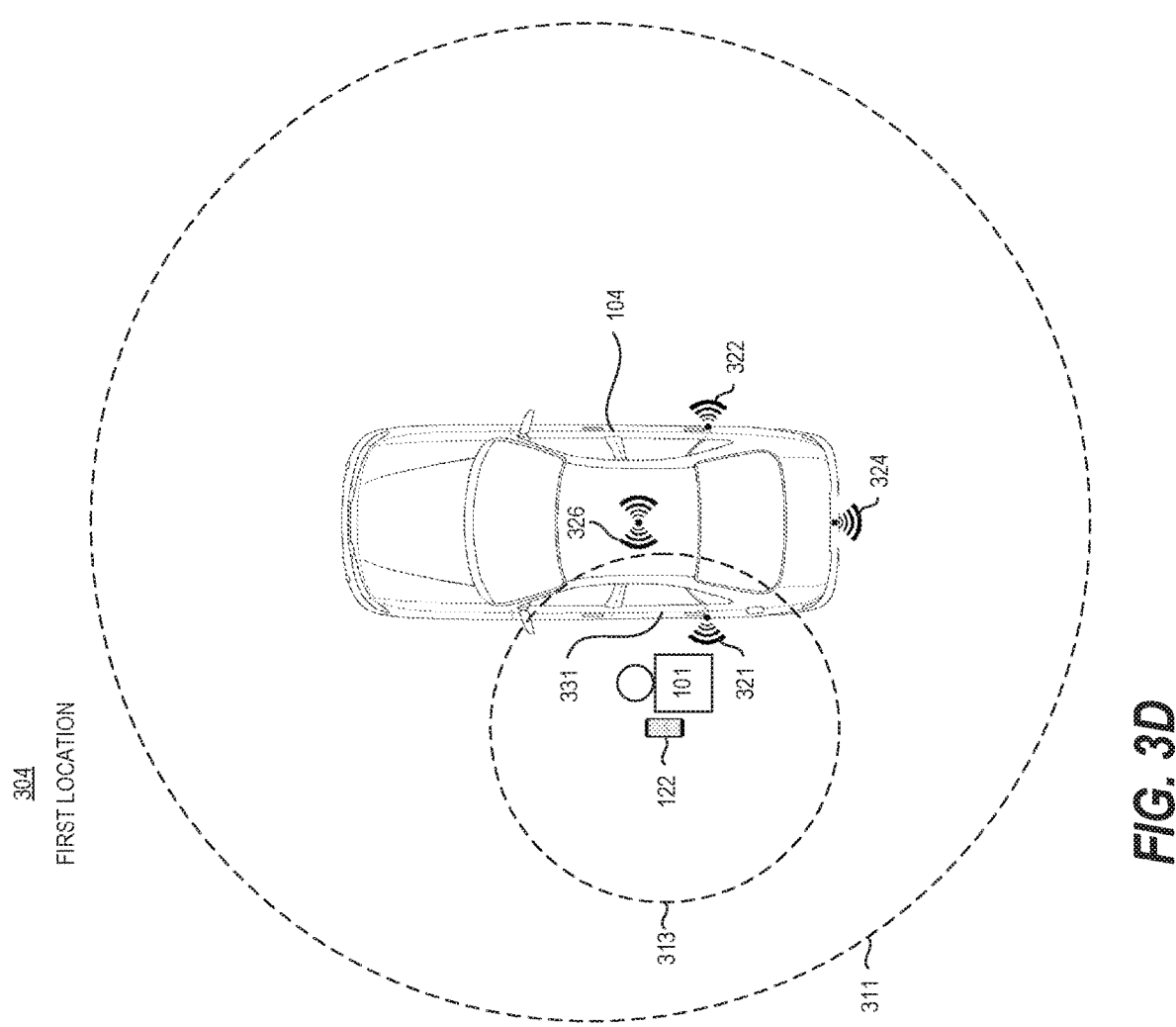

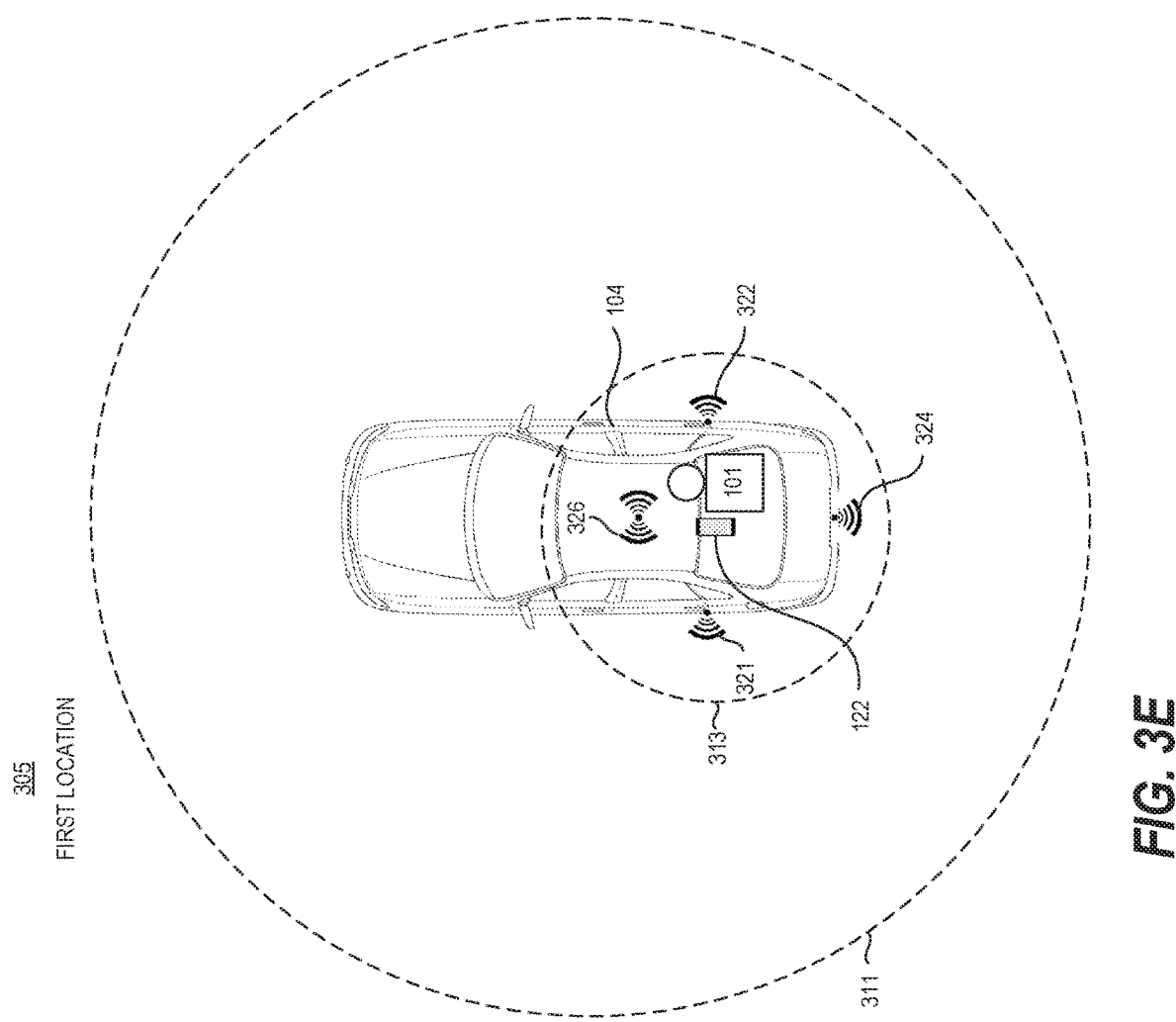

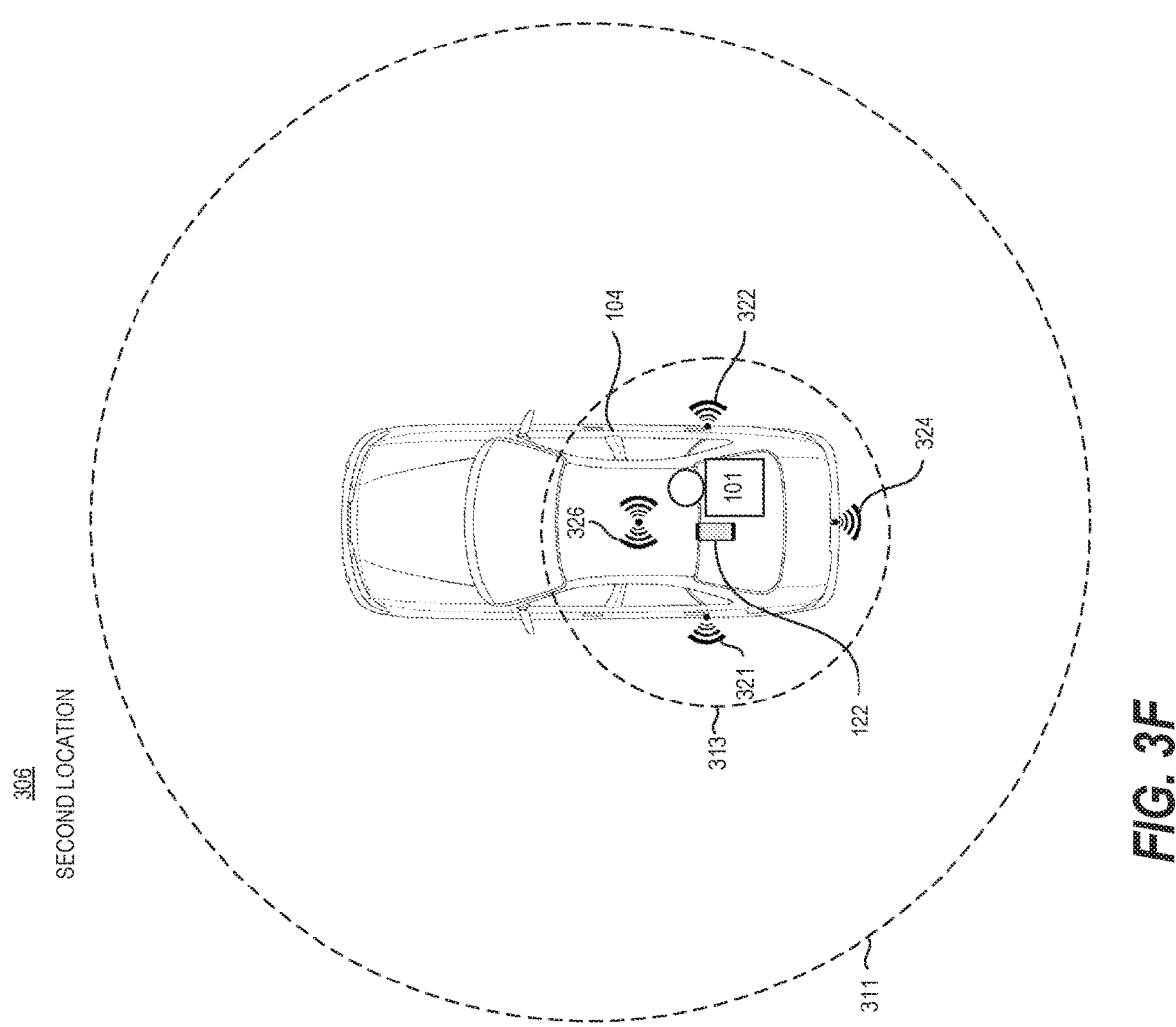

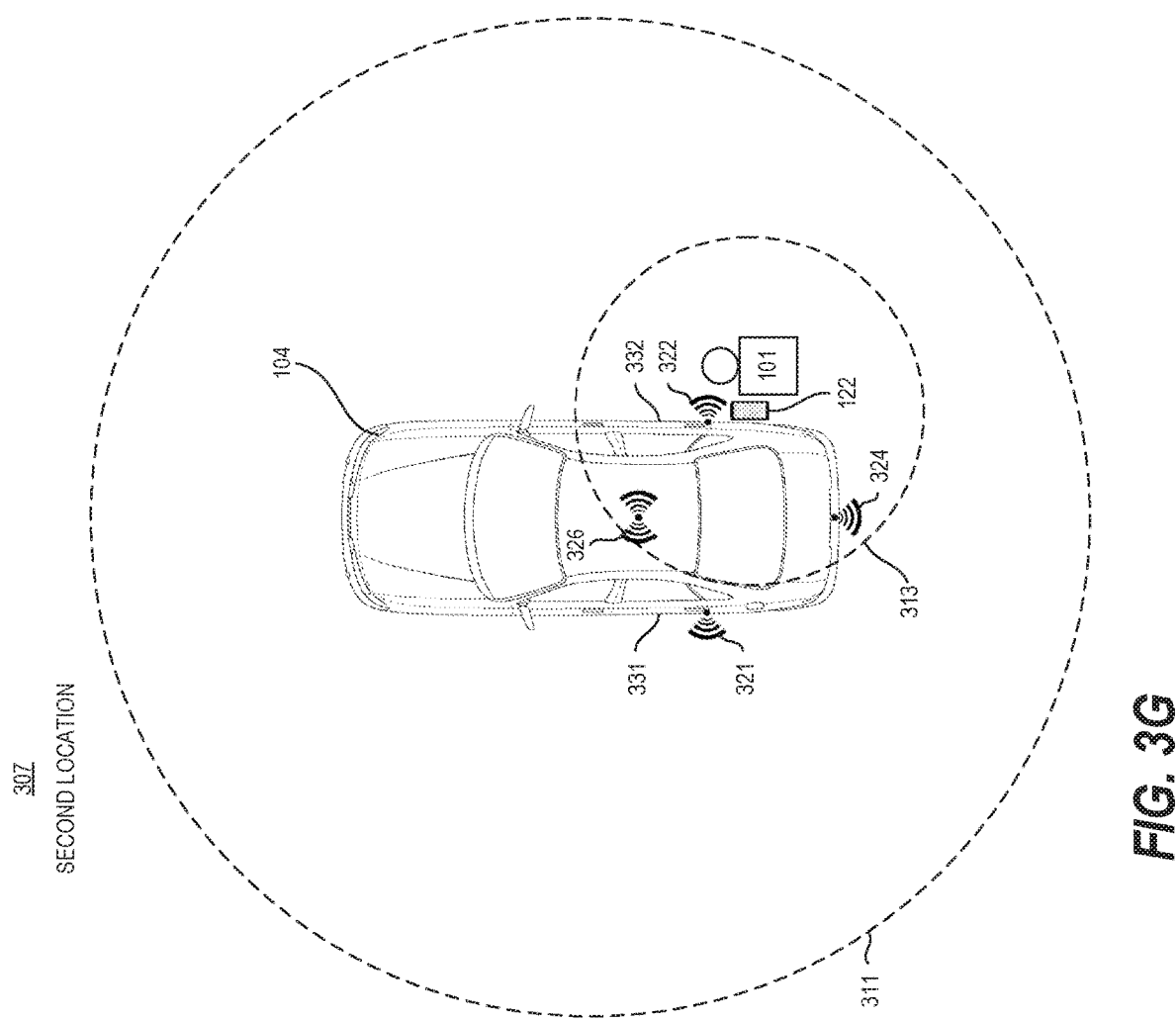

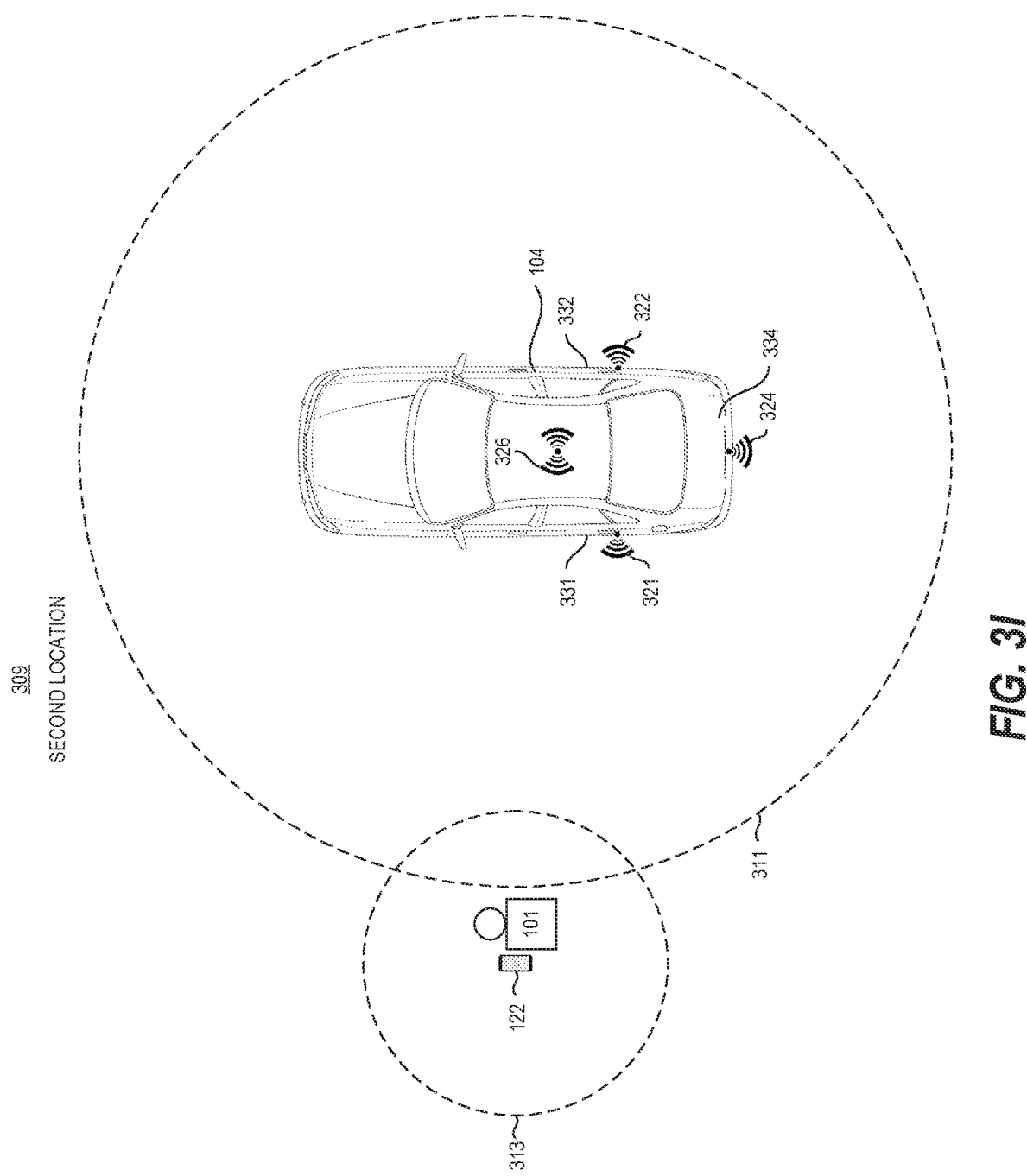

SYSTEMS AND METHODS FOR DETERMINING WHEN TO RELEASE CONTROL OF AN AUTONOMOUS VEHICLE

PRIORITY CLAIM

The present application claims the benefit of priority of U.S. Provisional Patent Application No. 62/552,558 filed Aug. 31, 2017, entitled "Systems And Methods For Determining When To Release Control Of An Autonomous Vehicle." The above-referenced patent application is incorporated herein by reference.

FIELD

Background

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle. The method includes providing, by a computing system including one or more computing devices, a control of the autonomous vehicle to a user associated with a vehicle service. The method includes identifying, by the computing system, one or more release signals indicative of one or more actions of the user. The method includes releasing, by the computing system, the control of the autonomous vehicle from the user, based at least in part on the one or more release signals.

Another example aspect of the present disclosure is directed to a computing system for controlling an autonomous vehicle. The computing system includes one or more processors and one or more tangible, non-transitory, computer readable media that collectively store instructions that when executed by the one or more processors cause the computing system to perform operations. The operations include providing a control of the autonomous vehicle to a user associated with a vehicle service. The operations include identifying one or more release signals indicative of one or more actions of the user. The operations include releasing the control of the autonomous vehicle from the user, based at least in part on the one or more release signals.

Yet another example aspect of the present disclosure is directed to an autonomous vehicle. The autonomous vehicle includes one or more vehicle input devices. The autonomous vehicle includes one or more processors and one or more tangible, non-transitory, computer readable media that collectively store instructions that when executed by the one or more processors cause the autonomous vehicle to perform operations. The operations include providing a control of the autonomous vehicle to a user associated with a vehicle service. The operations include identifying one or more release signals indicative of one or more actions of the user. The operations include releasing the control of the autonomous vehicle from the user, based at least in part on the one or more release signals.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIGS. 3A-3I depict an example autonomous vehicle providing a vehicle service according to example embodiments of the present disclosure;

Figure 1:
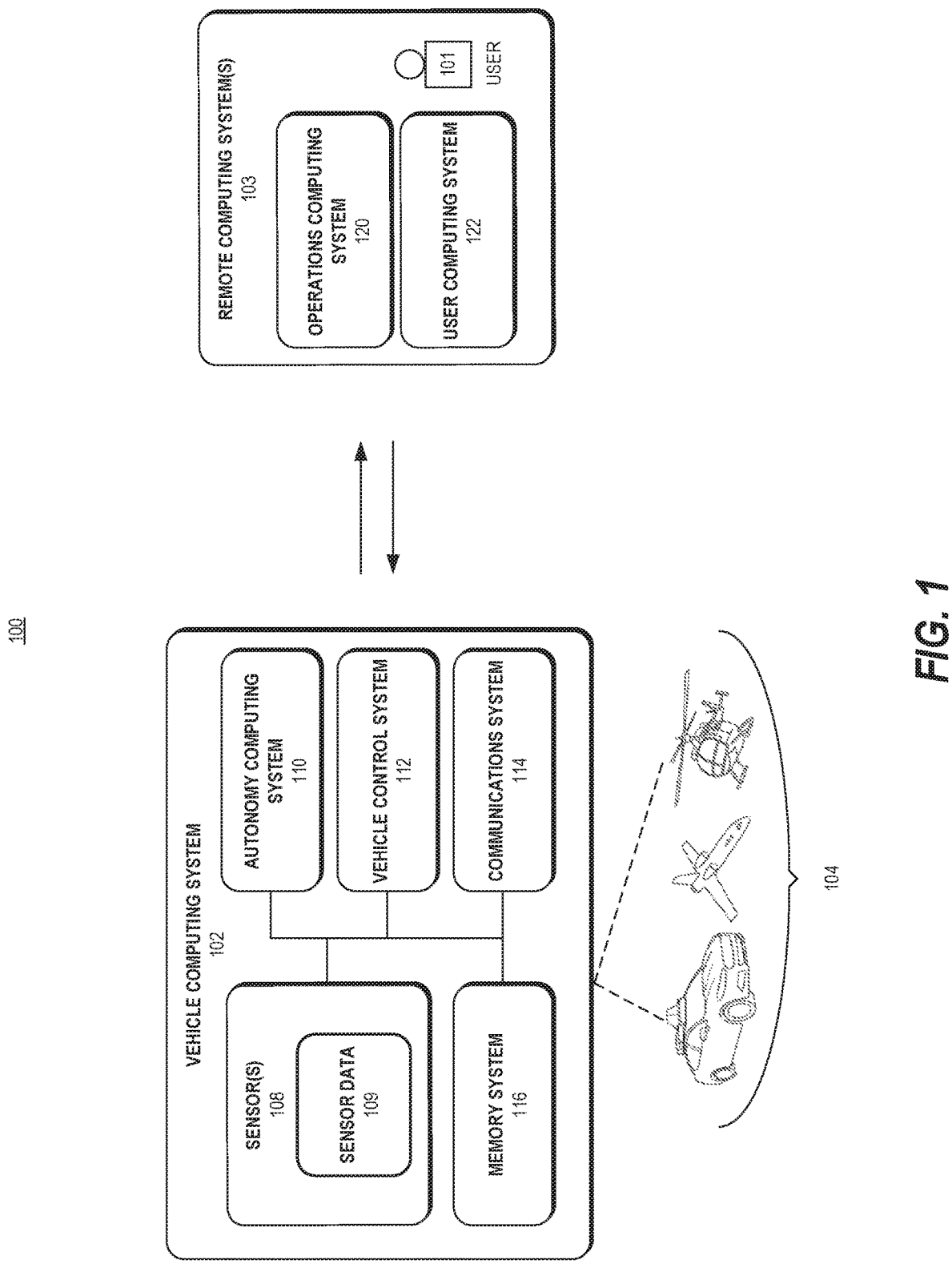
FIG. 1 depicts an example system overview according to example embodiments of the present disclosure.

Reference numerals that are repeated across plural figures are intended to identify the same components or features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an autonomous vehicle that can provide a vehicle service to a user, and in particular, to determining when the vehicle service is complete so that the autonomous vehicle can release the user's control over the autonomous vehicle. The autonomous vehicle can be part of a fleet of vehicles that include, for example, a plurality of autonomous vehicles that can drive, navigate, operate, etc. with minimal and/or no interaction from a human driver. A service provider can use the fleet of vehicles to provide one or more vehicle services (e.g., transportation service, delivery service, courier service, etc.) to a plurality of users. For example, a user can request a vehicle service from the service provider, and the service provider can select an autonomous vehicle from the fleet to provide the vehicle service for the user. The selected autonomous vehicle can provide the vehicle service, which can include providing the user a limited control over the autonomous vehicle. Additionally, or alternatively, the selected autonomous vehicle can provide one or more other users associated with the vehicle service with a limited control over the autonomous vehicle. When the vehicle service is completed, the autonomous vehicle (or the service provider) can release the user's or the users' control over the autonomous vehicle.

As an example, a user can request a transportation service from a first location (e.g., starting location) to a second location (e.g., ending location). A service provider can select an autonomous vehicle to service the user's request, and provide the autonomous vehicle with data indicative of the starting location. The autonomous vehicle can navigate to the starting location, where the autonomous vehicle can park to provide access to the user. The autonomous vehicle can permit the user to unlock a cabin door of the autonomous vehicle and enter the autonomous vehicle. The autonomous vehicle can navigate to the ending location, where the autonomous vehicle can park to allow the user to unlock a cabin door and exit the vehicle. After the user exits, the autonomous vehicle can determine that the vehicle service is complete, release the user's control, and drive away.

As another example, a first user can request a transportation service for transporting a second user. In this case, both the first user and the second user can be associated with the vehicle service, and an autonomous vehicle that provides the vehicle service can provide both the first and second users a limited control over the autonomous vehicle. When the autonomous vehicle arrives at an ending location associated with the vehicle service, and the second user exits the vehicle, the autonomous vehicle can release both users' control, and drive away.

As another example, a first user can request a courier/delivery service for items/goods from a first location (e.g., starting location) to a second location (e.g., ending location). The vehicle service can be associated with the first user at the starting location, and associated with a second user (e.g., recipient of the items/goods) at the ending location. An autonomous vehicle that provides the vehicle service can provide the first user a limited control over the autonomous vehicle at the starting location (e.g., to load the items/goods), and provide the second user a limited control over the autonomous vehicle at the ending location (e.g., to unload the items/goods). When the autonomous vehicle arrives at the ending location, and the second user unloads the items/goods, the autonomous vehicle can determine that the vehicle service is complete and release both the first and second user's control, and drive away. In some implementations, the autonomous vehicle can release the first user's control at a first time, and release the second user's control at a second time. For example, the autonomous vehicle can release the first user's control after the first user loads the items/goods but before the autonomous vehicle leaves the starting location to navigate to the ending location. The autonomous vehicle can release the second user's control after the second user unloads the items/goods at the ending location.

In some implementations, a service provider, or an autonomous vehicle selected to provide a vehicle service, can divide the vehicle service into two or more vehicle services. For example, a user can request a transportation service from a first location to a second location. A service provider can divide the transportation service into a first and second vehicle service, and select an autonomous vehicle to provide the first and second vehicle services. The first vehicle service can include a pickup service for the user at the first location. The autonomous vehicle can navigate from an initial location (e.g., starting location) to the first location (e.g., ending location), where the autonomous vehicle can park to provide access to the user. At the first location, the autonomous vehicle can permit the user to unlock a cabin door of the autonomous vehicle, and enter the autonomous vehicle. After the user enters, the autonomous vehicle can determine that the first vehicle service is complete, release the user's control, and drive away. The second vehicle service can include a drop off service for the user at the second location. The autonomous vehicle can navigate from the first location (e.g., starting location) to the second location (e.g., ending location), where the autonomous vehicle can park to provide access to the user. At the second location, the autonomous vehicle can permit the user to unlock a cabin door of the autonomous vehicle, and exit the autonomous vehicle. After the user exits, the autonomous vehicle can determine that the second vehicle service is complete, release the user's control, and drive away.

The present disclosure enables an autonomous vehicle to determine when a vehicle service is complete so that the autonomous vehicle can release a user's control over the autonomous vehicle, and optionally drive away. If, for example, an autonomous vehicle releases a user's control too quickly, then the user may not have sufficient time to access the autonomous vehicle (e.g., to enter, exit, load, or unload). On the other hand, if an autonomous vehicle releases a user's control too slowly, then the autonomous vehicle may idle for a lengthy duration, thus wasting resources, reducing efficiency, and increasing a wait-time for a user. Additionally, an amount of time for a user to enter, exit, load, or unload can vary from one user to another, and can vary from one vehicle service to another. For example, a user associated with a transportation service may travel alone without any luggage, or the user may have luggage that he or she wishes to load at a starting location and unload at an ending location. As another example, a user may be delayed by vehicle traffic, a physical disability, or a myriad of other conditions. The present disclosure enables an autonomous vehicle to, for example, determine when a user has safely entered and is seated in the autonomous vehicle, safely exited, finished loading, and/or finished unloading. The present disclosure enables an autonomous vehicle to determine that a vehicle service is complete when the autonomous vehicle determines, for example, that a user has safely entered, safely exited, finished loading, and/or finished unloading and release the user's control over the autonomous vehicle. In this way, a user can have sufficient time to access an autonomous vehicle, and the autonomous vehicle can avoid allocating excess access time for the user. Additionally, by determining when to release control for each user and each vehicle service, an autonomous vehicle can easily provide a plurality of different vehicle services to a plurality of different users.

More particularly, a service provider (e.g., owner, manager, entity) can use one or more vehicles (e.g., ground-based vehicles) to provide a vehicle service such as a transportation service (e.g., rideshare service), a courier service, a delivery service, etc. The vehicles can be autonomous vehicles that include various systems and devices configured to control an operation of the vehicle. For example, an autonomous vehicle can include an onboard vehicle computing system for operating the vehicle (e.g., located on or within the autonomous vehicle). The vehicle computing system can receive exterior sensor data from sensor(s) onboard the vehicle (e.g., cameras, LIDAR, RADAR, and/or other types of image capture devices and/or sensors), attempt to comprehend the vehicle's surrounding environment by performing various processing techniques on the sensor data, and generate an appropriate motion plan through the vehicle's surrounding environment. Additionally, the vehicle computing system can receive interior sensor data from sensor(s) onboard the vehicle (e.g., visible light cameras, infrared cameras, motion sensors, door sensors, pressure sensors, and/or other types of image capture devices and/or sensors). The vehicle computing system can attempt to comprehend the vehicle's interior environment by performing various processing techniques on the interior sensor data. Moreover, the autonomous vehicle can be configured to communicate with one or more computing devices that are remote from the vehicle. For example, the autonomous vehicle can communicate with an operations computing system that can be associated with the service provider. The operations computing system can help the service provider monitor, communicate with, manage, etc. the fleet of vehicles. As another example, the autonomous vehicle can communicate with a user computing system (e.g., mobile phone, mobile computer, desktop computer, etc.) that can be associated with a user. In some implementations, the operations computing system can mediate communication between the autonomous vehicle and the user computing system.

A user can submit a request (e.g., via the user computing system) to a service provider (e.g., manager, owner, entity) for a vehicle service. For instance, a user can submit a request to an operations computing system of a service provider. The vehicle service request can include a vehicle service type (e.g., transportation service, delivery service, courier service, etc.), a starting location (e.g., current location of the user, current location of an autonomous vehicle, pickup location for items/goods, or other location), an ending location (e.g., destination of the user, destination of an autonomous vehicle, drop-off location for items/goods, or other location), and an identifier for one or more users associated with the vehicle service (e.g., phone number, radio address, network address, IMEI number, RFID tag, biometric data, or other data that can be used to identify and/or communicate with the user).

An operations computing system can process a vehicle service request and select an autonomous vehicle to provide a requested vehicle service for a user. The operations computing system can provide the selected autonomous vehicle with data representing one or more location(s) associated with the vehicle service. The location(s) can include, for example, a starting location and ending location associated with the vehicle service. The location(s) can be expressed as a coordinate (e.g., GPS coordinate, latitude-longitude coordinate pair), an address, a place name, and/or another geographic reference that can be used to identify the location.

An autonomous vehicle selected to provide a vehicle service can obtain data indicative of an ending location associated with the vehicle service (e.g., from an operations computing system, user computing system, etc.). The autonomous vehicle can also obtain a vehicle route that leads to the ending location. The vehicle route can be, for example, a route from a current location of the autonomous vehicle to a location associated with a user, or a route from a first location associated with the user to a second location associated with the user, etc. In some implementations, the operations computing system can provide the vehicle route to the autonomous vehicle. Additionally, or alternatively, the onboard vehicle computing system of the autonomous vehicle can determine the vehicle route.

According to an aspect of the present disclosure, the selected autonomous vehicle can provide a user associated with the vehicle service with a limited control over the autonomous vehicle. When the autonomous vehicle provides the limited control to the user, the autonomous vehicle can process sensor data from sensor(s) onboard the vehicle to identify or more release signal(s), and generate release signal data indicative of the release signal(s). When the autonomous arrives at an ending location associated with a vehicle service, the autonomous vehicle can retrieve the release signal data to determine when the vehicle service is complete. The release signal(s) can include, for example, a sensor reading (e.g., motion, pressure, trigger, etc.), an action of a user associated with the vehicle service, an event or condition in a surrounding environment, an instruction from a remote computing system (e.g., operations computing system, user computing system, etc.), and/or other signal(s) that can indicate when a vehicle service is complete. The release signal data can include, for example, data representing a number of passengers that entered the autonomous vehicle, an identifier of a pressure sensor that is triggered, an identifier of a door sensor that is triggered, a motion detected inside the autonomous vehicle, an identifier of a person or object inside the autonomous vehicle (e.g., visual profile, heat signature, detected motion, user computing system, etc.), a proximity of a user to the autonomous vehicle, etc.

According to an aspect of the present disclosure, the autonomous vehicle can determine that the vehicle service is complete based at least in part on the release signal data. For example, if the release signal data indicates that two passengers (e.g., a user and a companion) entered an autonomous vehicle at a starting location, then the autonomous vehicle can determine that the vehicle service is complete after two passengers exit the autonomous vehicle at the ending location. As another example, if the release signal data indicates that pressure sensors in three seats are activated, then the autonomous vehicle can determine that the vehicle service is complete after the pressure sensors in the three seats are deactivated. Additionally and/or alternatively, an autonomous vehicle can determine that the pressure sensors indicate three passengers in the autonomous vehicle, and determine that the vehicle service is complete after three passengers exit the autonomous vehicle at the ending location. As yet another example, if the release signal data indicates that a cargo door of the autonomous vehicle is opened at a starting location (e.g., to load luggage, items, goods, etc.), then the autonomous vehicle can determine that the vehicle service is complete after the cargo door is opened at the ending location (e.g., to unload luggage, items, goods, etc.). As yet another example, if the release signal data indicates motion inside the autonomous vehicle (e.g., caused by motion of passengers exiting), then the autonomous vehicle can determine that the vehicle service is complete after the motion stops. As yet another example, if the autonomous vehicle determines that an image of its interior does not match a reference image (e.g., because a user left behind an object in the autonomous vehicle), then the autonomous vehicle can determine that the vehicle service is complete when the interior image matches the reference image (e.g., after the object is removed). As yet another example, if the release signal data indicates that an RF signal corresponding to a user computing system is within proximity of the autonomous vehicle, then the autonomous vehicle can determine that the vehicle service is complete when the user computing system is at least a minimum distance from the autonomous vehicle. In some implementations, an autonomous vehicle can allocate a buffer time after determining that a vehicle service is complete and before the autonomous vehicle releases a user's control (e.g., to ensure that one or more users are a safe distance from the autonomous vehicle). The kind and quantity of the release signal(s) can vary based on the capabilities (e.g., available hardware/software) of an autonomous vehicle, and/or a user device corresponding to the user. For example, a first autonomous vehicle can include seat pressure sensors, but a second autonomous vehicle can omit seat pressure sensors. As another example, a first user device can include Bluetooth, but a second user device can omit Bluetooth. When the autonomous vehicle determines that the vehicle service is complete, the autonomous vehicle can release a user's control and drive away.

According to an aspect of the present disclosure, the autonomous vehicle can determine a confidence score based on the release signal data to determine when a vehicle service is complete. The autonomous vehicle can determine the confidence score by assigning a weight to each release signal, and processing each release signal according to the assigned weight. In some implementations, the autonomous vehicle can assign a weight to a release signal based on an accuracy and/or reliability of the release signal. For example, a seat pressure sensor in an autonomous vehicle can accurately detect when pressure is exerted, but may not be a reliable indicator of a number of passengers in the autonomous vehicle. As another example, a cargo door sensor can accurately detect if the cargo door is opened, but may not be a reliable indicator that a user is loading cargo. As yet another example, a motion sensor can accurately detect motion, but may be unreliable when an object or person is motionless (e.g., sleeping). As yet another example, an interior camera can reliably indicate an interior environment of an autonomous vehicle, but may not always be accurate (e.g., due to low light, shadows, poor contrast, obstructions, etc.). The autonomous vehicle can compare the confidence score to a confidence threshold, and determine that the vehicle service is complete when the confidence score is equal to or greater than the confidence threshold. When the autonomous vehicle determines that the vehicle service is complete, the autonomous vehicle can release control from one or more users, and drive away.

According to an aspect of the present disclosure, the autonomous vehicle can process the release signal(s) to adjust for any discrepancies among the release signal(s) when determining the confidence score. For example, a first release signal (e.g., RF signal) can indicate that a user is farther than a threshold distance from an autonomous vehicle, and a second release signal (e.g., interior camera) can indicate that the user left a bag inside the autonomous vehicle. Based on the first release signal, the autonomous vehicle can determine that a vehicle service associated with the user is complete and release the user's control; but, based on the second release signal, the autonomous vehicle can determine that the vehicle service is not complete. The autonomous vehicle can process the first and second release signals in accordance with their assigned weights, to determine a single confidence score. If the confidence score is equal to or greater than a confidence threshold, then the autonomous vehicle can determine that the vehicle service is complete, and release the user's control.

According to an aspect of the present disclosure, if the confidence score is less than the confidence threshold, then the autonomous vehicle can request a user to manually release control of the autonomous vehicle. For example, an autonomous vehicle can send a notification to a user computing system of a user associated with the vehicle service. The notification can include a reminder that the autonomous vehicle is waiting to complete the vehicle service associated with the user. Additionally, or alternatively, the notification can include a request for the user to confirm that the vehicle service is complete (e.g., via the user computing system). If the user confirms that the vehicle service is complete, then the autonomous vehicle can release the user's control and drive away (e.g., to provide another vehicle service). If the user does not confirm that the vehicle service is complete (e.g., the user does not respond to the notification, or denies the request), then the autonomous vehicle can wait for a predetermined duration of time before re-sending the notification.

According to an aspect of the present disclosure, if a user does confirm that the vehicle service is complete (e.g., the user does not respond to the notification, or denies the request), then the autonomous vehicle can notify the operations computing system. The operations computing system can obtain sensor data and release signal data from the autonomous vehicle, and determine an appropriate action based at least in part on the sensor data and release signal data. For example, the operations computing system can determine that a vehicle service is complete and instruct/force an autonomous vehicle to release a user's control. As another example, if a user forgets an item in the autonomous vehicle, then the operations computing system can instruct the autonomous vehicle to navigate to a lost-and-found location to unload the item for pick-up by the user at a later time. Additionally, or alternatively, if a user forgets to unload an item/good being couriered/delivered by the autonomous vehicle, then the operations computing system can instruct the autonomous vehicle to navigate back to a starting location to return the item/good.

The systems and methods described herein provide a number of technical effects and benefits. Systems and methods for determining when to release a user's control of an autonomous vehicle can have a technical effect of improving efficiency in resource management. By enabling an autonomous vehicle to automatically determine when a user has safely and completely embarked, disembarked, loaded, or unloaded, the autonomous vehicle can adapt its operation to accommodate for user variability. Furthermore, if a user forgets something in the autonomous vehicle, then the autonomous vehicle can notify and provide an opportunity for the user to retrieve it, instead of driving away. This allows the autonomous vehicle to better provide a vehicle service for a user, by providing greater personalization and convenience.

The systems and methods of the present disclosure also provide an improvement to vehicle computing technology, such as autonomous vehicle computing technology. For instance, the systems and methods herein enable the vehicle technology to automatically determine when to release a user's control of an autonomous vehicle. For example, the systems and methods can allow one or more computing system(s) onboard an autonomous vehicle (and/or off-board a vehicle) to identify and track one or more release signal(s), and control the autonomous vehicle accordingly. As described herein, an autonomous vehicle can be configured to provide data indicative of its interior and/or exterior environment to one or more other computing system(s) (e.g., operations computing system, user computing system, etc.). This allows the autonomous vehicle to more effectively perform autonomous navigation.

Example Embodiments

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104.

In some implementations, the system 100 can include one or more remote computing system(s) 103 that are remote from the vehicle 104. The remote computing system(s) 103 can include an operations computing system 120, and a user computing system 122. The remote computing system(s) 103 can be separate from one another or share computing device(s). The operations computing system 120 can remotely manage the vehicle 104.

The user computing system 122 can be associated with a user 101, and can communicate with the vehicle computing system 102. For example, the user 101 can request a first vehicle service via the user computing system 122 (e.g., a mobile phone device). In some implementations, the user 101 can generate a service request via a software application on the user computing system 122. The user computing system 122 can provide data indicative of the service request to the operations computing system 120 (e.g., which can assign the vehicle 104 to such a request) and/or to the vehicle computing system 102. In response to the request, the vehicle computing system 102 can control the vehicle 104 to travel to a first location associated with the request. In some implementations, the user computing system 122 can remotely manage the vehicle 104. For example, the user 101 can lock/unlock a cabin door of vehicle 104, adjust a cabin climate control setting of vehicle 104, or change a destination of the vehicle 104.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

As shown in FIG. 1, the vehicle 104 can include one or more sensors 108, an autonomy computing system 110, a vehicle control system 112, a communications system 114, and a memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

According to an aspect of the present disclosure, the sensor(s) 108 can be configured to acquire sensor data 109 associated with an interior environment of the vehicle 104. The sensor data 109 can include one or more sensor readings and be associated with one or more objects that occupy the interior environment of the vehicle 104. For example, the sensor data 109 can include image data, motion capture data, and/or other data acquired by the sensors 108 indicative of when a vehicle service being provided by the vehicle 104 is completed. The object(s) can include one or more user(s), passenger(s), cargo, items/goods, and/or other objects associated with the vehicle service, and can be located in a cabin compartment, storage compartment, or other compartment of the vehicle 104.

In some implementations, the sensor data 109 can include data indicative of the object(s) at one or more times (e.g., a first time that corresponds to a starting location, a second time that corresponds to an ending location). For example, when providing a transportation service for a user from a starting location to an ending location, the sensor data 109 can include data indicating that the user enters the vehicle 104 at the starting location, and that the user exits the vehicle 104 at the ending location. In particular, the sensor data 109 can include data that tracks a first action of the user approaching and entering the vehicle 104 at the starting location; and a second action of the user exiting the vehicle 104 at the ending location.

Figure 2:
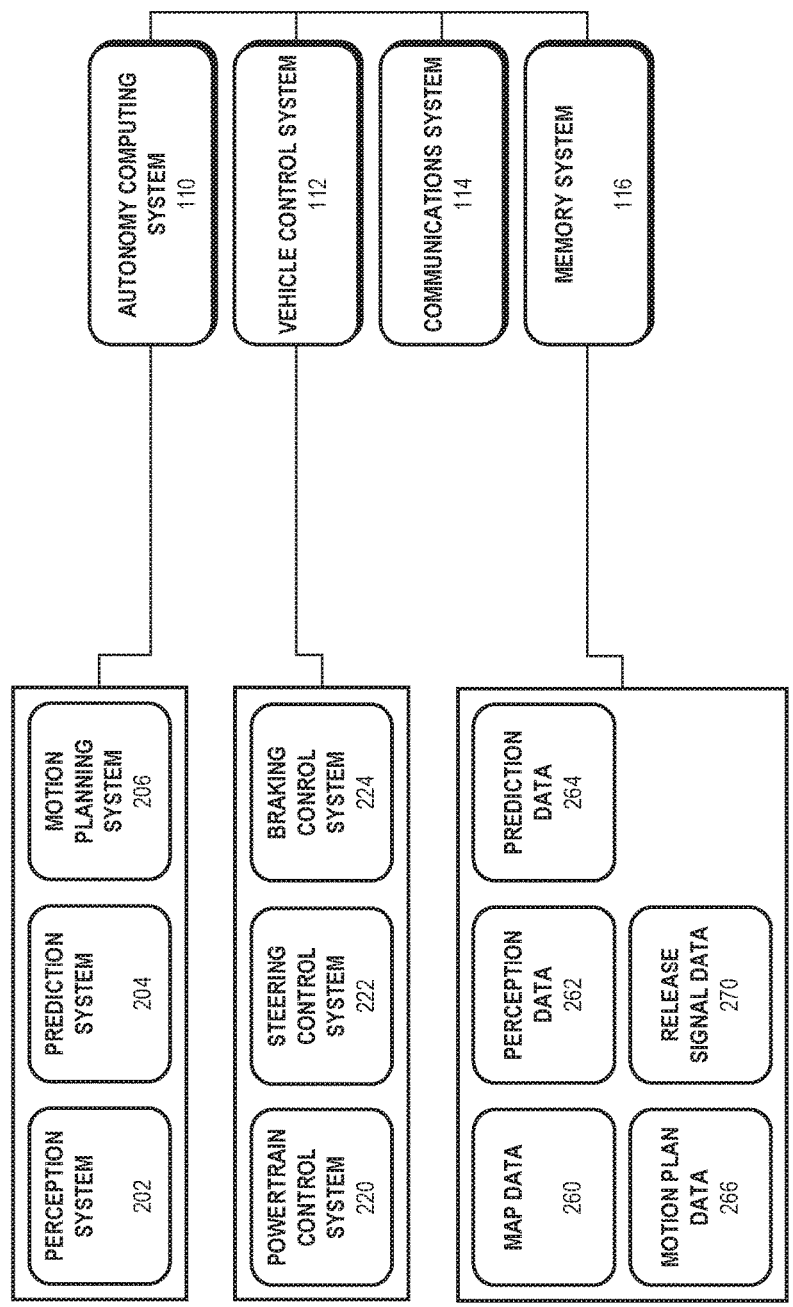
FIG. 2 depicts an example vehicle control system for controlling an autonomous vehicle according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with other computing systems (e.g., remote computing system(s) 103). The vehicle computing system 102 can use the communications system 114 to communicate with the operations computing system 120 and/or one or more other remote computing system(s) (e.g., user computing system 122) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), including, for example, transmitters, receivers, ports, controllers, antennas, and/or other suitable sub-systems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, and release signal data 270.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

According to an aspect of the present disclosure, the vehicle computing system 102 can perform various processing techniques on the sensor data 109 to identify or more release signal(s), and generate release signal data 270. The vehicle computing system 102 can retrieve the release signal data 270 when arriving at an ending location associated with a vehicle service, to determine whether the vehicle service is complete. The release signal(s) can include, for example, a sensor reading (e.g., motion, pressure, trigger, etc.), an action of a user associated with the vehicle service, an event or condition in a surrounding environment, an instruction from a remote computing system (e.g., operations computing system, user computing system, etc.), and/or other signal(s) that can indicate when the vehicle service is complete. The release signal data 270 can include, for example, data representing a number of passengers that entered the vehicle 104, an identifier of a pressure sensor that is triggered, an identifier of a door sensor that is triggered, a motion detected inside the vehicle 104, an identifier of a person or object inside the vehicle 104 (e.g., visual profile, heat signature, detected motion, user computing system, etc.), a proximity of a user to the vehicle 104, etc.

FIGS. 3A-3I depict examples of the vehicle 104 providing a vehicle service to the user 101. In particular, FIGS. 3A-3E depict examples of the vehicle 104 providing a vehicle service to pick-up the user 101 at a first location, and FIGS. 3F-3I depict examples of the vehicle 104 providing a vehicle service to drop-off the user 101 at a second location. In FIGS. 3A-3E, the vehicle 104 can arrive at the first location and provide access to the user 101, and in FIGS. 3F-3I, the vehicle 104 can arrive at the second location and provide access to the user 101.

Figure 3A:
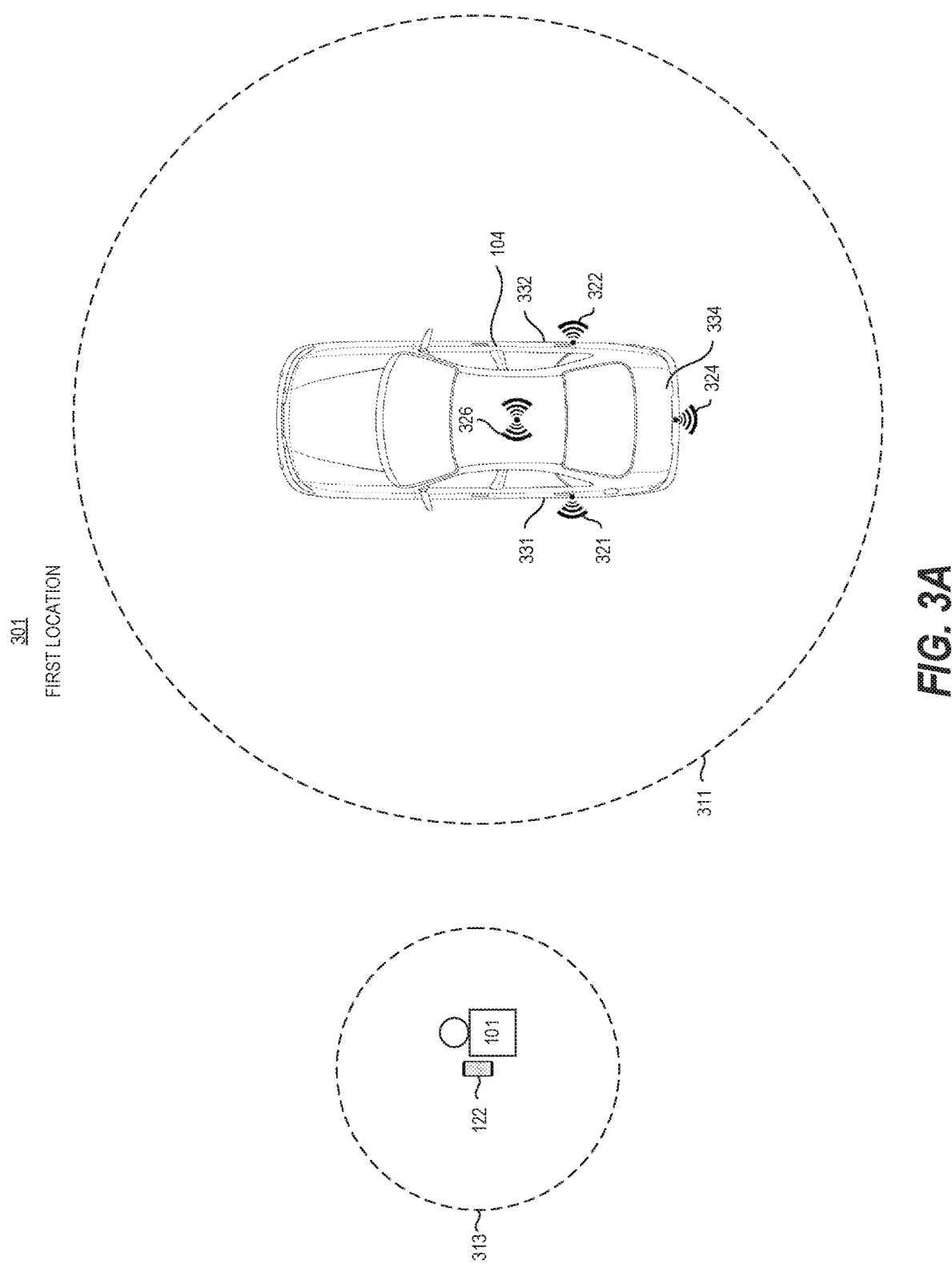

FIG. 3A depicts a diagram 301 of the user 101 at a first position with respect to the vehicle 104. The vehicle 104 can include a motion sensor with a sensor range 311, first cabin door sensor 321, second cabin door sensor 322, cargo door sensor 324, and/or another sensor 326 (e.g., Bluetooth sensor, etc.). The user 101 can carry a user computing system 122, and move in the surrounding environment of the vehicle 104. The user computing system 122 can include a radio (e.g., Bluetooth radio, etc.) with a transmission range 313.

Figure 3B:
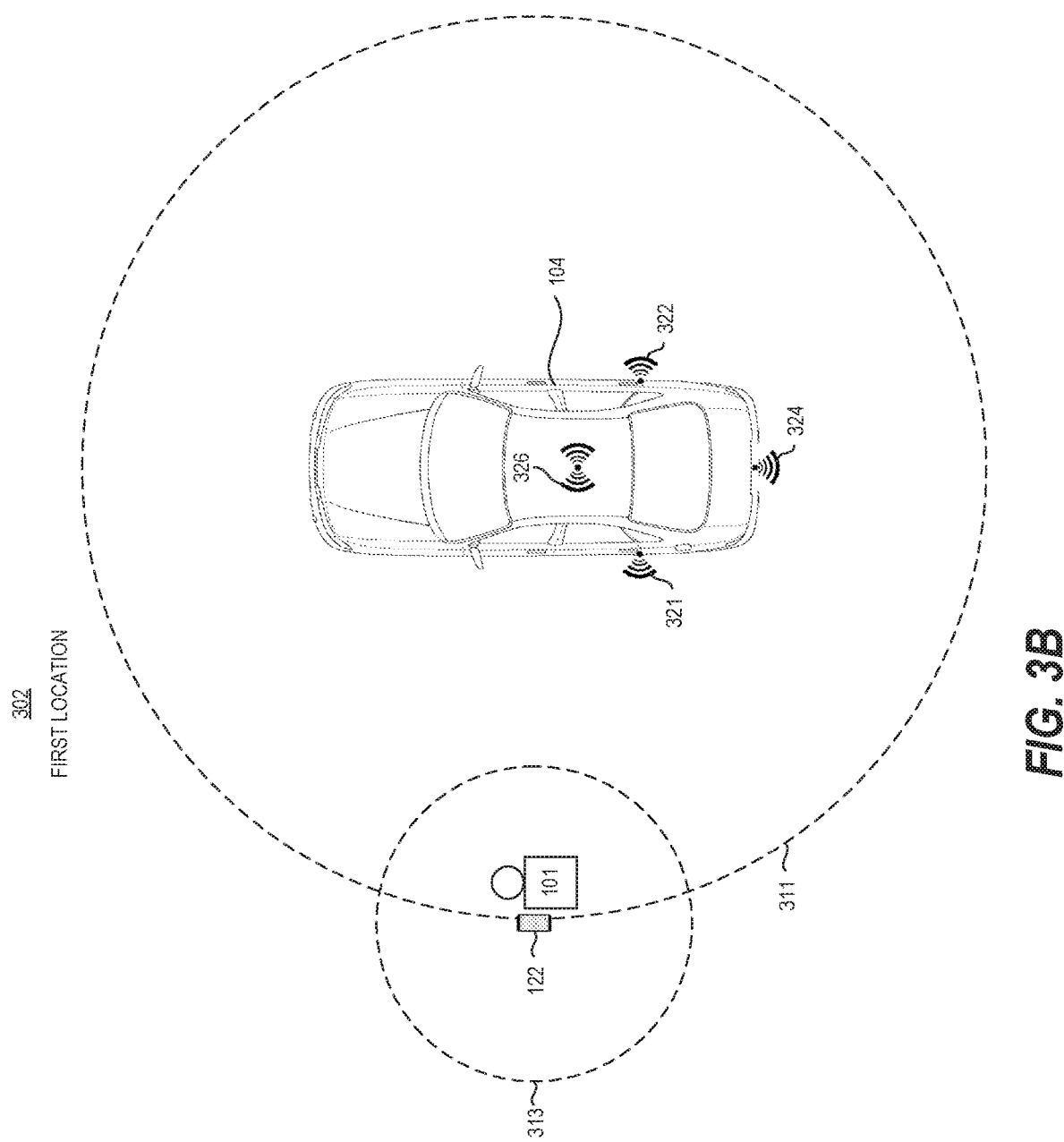

FIG. 3B depicts a diagram 302 of the user 101 at a second position with respect to the vehicle 104. In particular, the user 101 is within the sensor range 311. The motion sensor of the vehicle 104 can generate sensor data 109 indicative of the presence of the user 101. The vehicle computing system 102 can process the sensor data 109 to identify a release signal corresponding to the sensor data generated by the motion sensor. The vehicle computing system 102 can analyze the release signal to generate release signal data 270 indicating that the user 101 is within the sensor range 311. In some implementations, the vehicle computing system 102 can track a position of the user 101 within the sensor range 311 via the motion sensor (e.g., if granted user permission).

FIG. 3C depicts a diagram 303 of the user 101 at a third position with respect to the vehicle 104. In particular, the user 101 can access a cargo hold of the vehicle 104. The cargo door sensor 324 can generate sensor data 109 indicative of the cargo door 334 being opened. The vehicle computing system 102 can process the sensor data 109 to identify a release signal corresponding to the sensor data generated by the cargo door sensor 324. The vehicle computing system 102 can analyze the release signal to generate release signal data 270 indicating that the user 101 has accessed the cargo hold.

FIG. 3D depicts a diagram 304 of the user 101 at a fourth position with respect to the vehicle 104. In particular, the user 101 can access the cabin of the vehicle 104 via a cabin door 331. The cabin door sensor 321 can generate sensor data 109 indicative of the cabin door 331 being opened. The vehicle computing system 102 can process the sensor data 109 to identify a release signal corresponding to the sensor data generated by the cabin door sensor 321. The vehicle computing system 102 can analyze the release signal to generate release signal data 270 indicating that the user 101 has accessed the cabin.

FIG. 3E depicts a diagram 305 of the user 101 at a fifth position with respect to the vehicle 104. In particular, the user 101 can enter the cabin of the vehicle 104. When the user 101 enters the vehicle 104, the transmission range 313 of the user computing system 122 can overlap with the communication range of the sensor 326 (e.g., such that Bluetooth low energy protocol signals can be transmission to and/or from such devices). The sensor 326 can generate sensor data 109 indicative of the detected signals (e.g., Bluetooth signals) of the user computing system 122. The vehicle computing system 102 can process the sensor data 109 to identify a release signal corresponding to the sensor data generated by the sensor 326. The vehicle computing system 102 can analyze the release signal to generate release signal data 270 indicating a position of the user computing system 122 and an identity of the user 101 associated with the user computing system 122.

FIGS. 3F-3I depict examples of the vehicle 104 providing a vehicle service to drop-off the user 101 at a second location. The vehicle 104 can arrive at the second location and provide access to the user 101. FIG. 3F depicts a diagram 306 of the user 101 at a sixth position with respect to the vehicle 104. When the vehicle 104 arrives at the second location, the vehicle computing system 102 can retrieve the release signal data 270 to determine whether the vehicle service is complete. For example, the vehicle computing system 102 can determine that the vehicle service is associated with the user 101 whose current position is inside the cabin of the vehicle 104, based on the release signal data 270. The vehicle computing system 102 can determine that for the current vehicle service type (e.g., transportation service), the user 101 must exit the vehicle 104 to complete the vehicle service. As another example, the vehicle computing system 102 can determine that the user 101 accessed the cargo door of the vehicle 104 when entering the vehicle 104 at the first location. The vehicle computing system 102 can determine that the user 101 loaded an item into the cargo hold of the vehicle 104, and that the user 101 must unload the item to complete the vehicle service.

FIG. 3G depicts a diagram 307 of the user 101 at a seventh position with respect to the vehicle 104. In particular, the user 101 exits the vehicle 104 via the second cabin door 332. The second cabin door sensor 322 can generate sensor data 109 indicative of the second cabin door 332 being opened. The vehicle computing system 102 can process the sensor data 109 to identify a release signal corresponding to the sensor data generated by the second cabin door sensor 322. The vehicle computing system 102 can analyze the release signal to determine that the user 101 has exited the vehicle 104. In some implementations, the vehicle computing system 102 can analyze the release signal to generate release signal data 270 indicating that the user 101 has exited the vehicle 104.

Figure 3H:
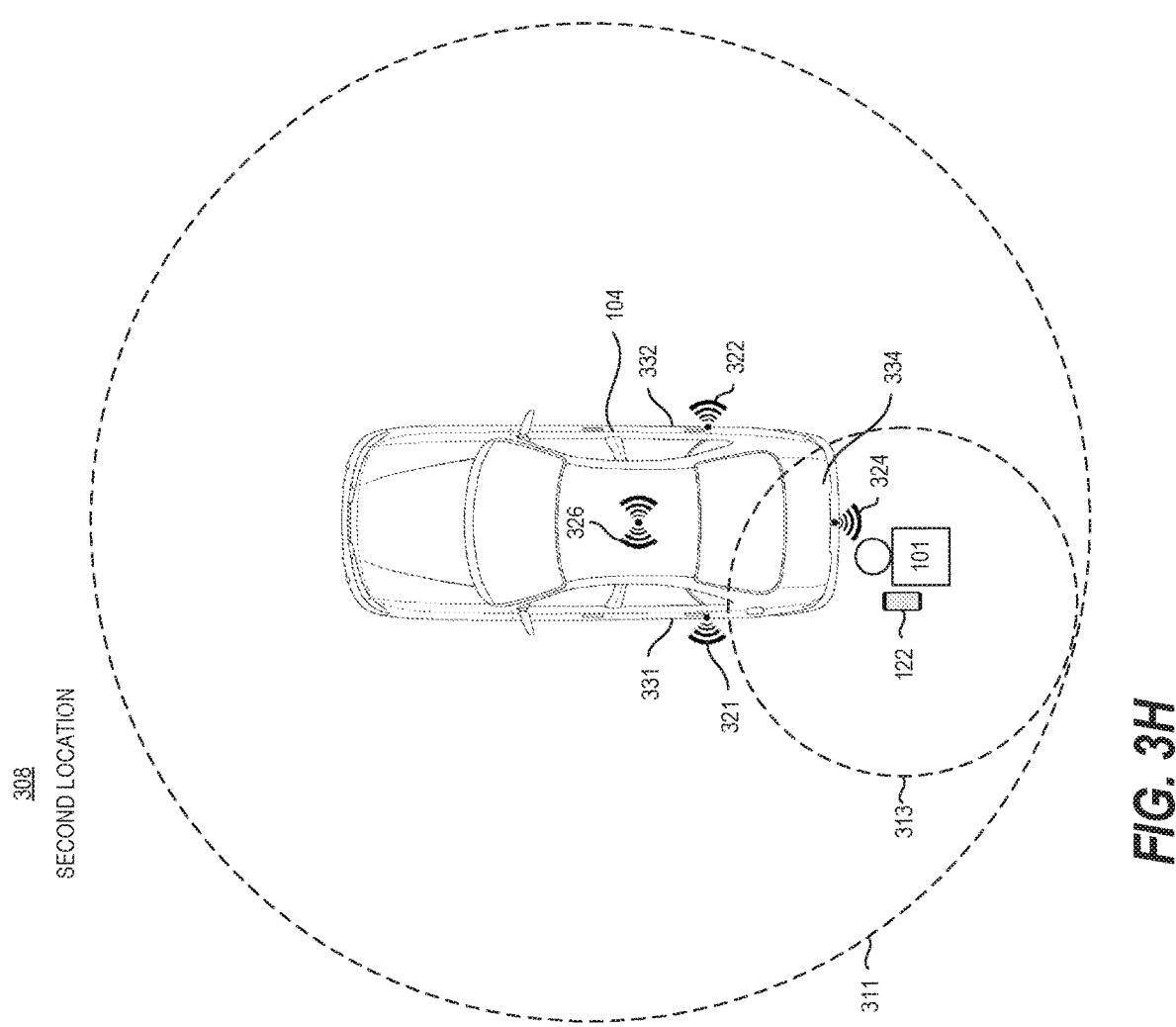

FIG. 3H depicts a diagram 308 of the user 101 at an eighth position with respect to the vehicle 104. In particular, the user 101 can open the cargo door 334 to access the cargo hold of the vehicle 104. The cabin door sensor 324 can generate sensor data 109 indicative of the cargo door 334 being opened. The vehicle computing system 102 can process the sensor data 109 to identify a release signal corresponding to the sensor data generated by the cargo door sensor 322. The vehicle computing system 102 can analyze the release signal to determine that the user 101 has unloaded an item from the cargo hold. In some implementations, the vehicle computing system 102 can analyze the release signal to generate release signal data 270 indicating that the user 101 has unloaded an item from the cargo hold.

Additionally, or alternatively, the sensor 326 (e.g., Bluetooth sensor) can generate sensor data 109 indicative of the sensor 326 being inside the transmission range 313. The vehicle computing system 102 can process the sensor data 109 to identify a release signal corresponding to the sensor data generated by the sensor 326. The vehicle computing system 102 can analyze the release signal to determine that the user 101 has exited the vehicle 104. In some implementations, the vehicle computing system 102 can analyze the release signal to generate release signal data 270 indicating that the user 101 has exited the vehicle 104.

FIG. 3I depicts a diagram 309 of the user 101 at a ninth position with respect to the vehicle 104. In particular, the user 101 can move away from the vehicle 104 outside the sensor range 311 of the vehicle 104. The vehicle computing system 102 can track a position of the user 101 within the sensor range 311 via the motion sensor, and the motion sensor can generate sensor data 109 indicative of the user 101 being outside the sensor range 311. The vehicle computing system 102 can process the sensor data 109 to identify a release signal corresponding to the sensor data generated by the motion sensor. The vehicle computing system 102 can analyze the release signal to determine that the user 101 is a safe distance from the vehicle 104. In some implementations, the vehicle computing system 102 can analyze the release signal to generate release signal data 270 indicating that the user 101 is a safe distance from the vehicle 104. The vehicle computing system 102 can determine that the vehicle service is complete, release the user 101's control over the vehicle 104, and cause the vehicle 104 to drive away.

Figure 4:
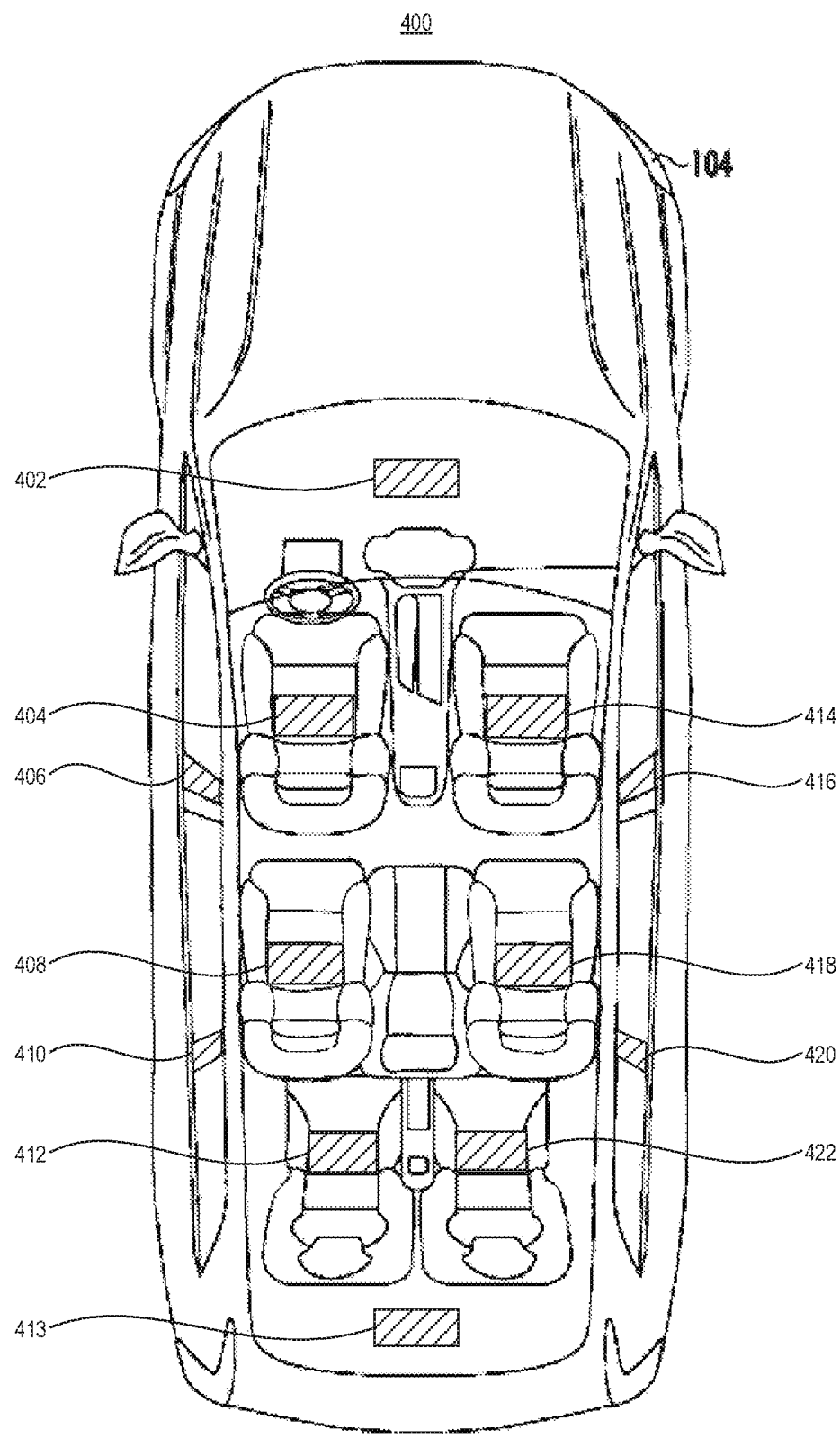
FIG. 4 depicts an example autonomous vehicle providing a vehicle service according to example embodiments of the present disclosure.

FIG. 4 depicts a diagram 400 of sensors 402-422 configured to acquire sensor data 109 associated with an interior environment of the vehicle 104. The sensors 402-422 can be any one or a combination of a visible light camera, infrared camera, motion sensor, event sensor, pressure sensor, and/or other types of image capture devices and/or sensors. The sensors 402-422 can generate sensor data 109 indicative of one or more objects that occupy the interior environment of the vehicle 104.

For example, the sensors 402, 406, 410, 416, and 418 can be an image capture device/sensor (e.g., visible light camera, infrared camera, motion sensor) that generates signal data 109 indicative of a presence of the user 101 inside the vehicle 104. As another example, the sensors 404, 408, 412, 413, 414, 418, and 422 can be pressure sensors that generate signal data 109 indicative of a pressure detected by the sensors, respectively. The pressure sensor 404, 408, 412, 418, and 422 can be configured to detect a pressure associated with a seat in the vehicle 104, and the pressure sensor 413 can be configured to detect a pressure associated with a cargo hold of the vehicle 104.

According to an aspect of the present disclosure, the vehicle computing system 102 can process the sensor data 109 generated by the sensors 402-422 to identify one or more release signals, and generate release signal data 270.

Figure 5:
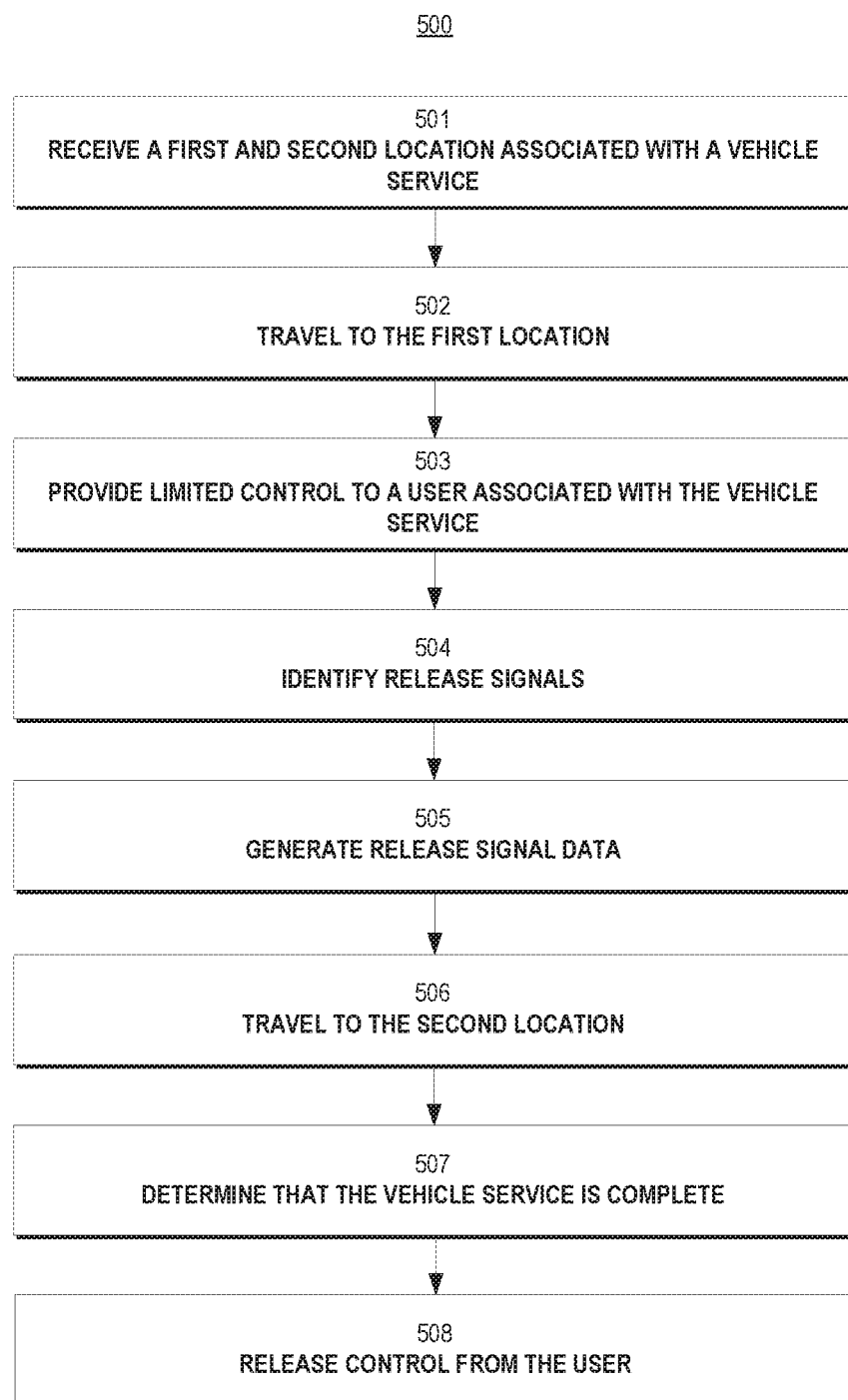
FIG. 5 depicts a flow diagram of controlling an autonomous vehicle according to example embodiments of the present disclosure.

FIG. 5 depicts a flow diagram of an example method for controlling an autonomous vehicle according to example embodiments of the present disclosure. One or more portion(s) of the method 500 can be implemented as operations by one or more computing system(s) such as, for example, the computing system(s) 102, 120, 122, 601, and 610 shown in FIGS. 1, 2, and 6. Moreover, one or more portion(s) of the method 500 can be implemented as an algorithm on the hardware components of the system(s) described herein (e.g., as in FIGS. 1, 2, and 6) to, for example, determine when a vehicle service is complete so that the vehicle computing system 102 can release a user's control over the vehicle 104. FIG. 5 depicts elements performed in a particular order for purposes of illustration and discussion. Those of ordinary skill in the art, using the disclosures provided herein, will understand that the elements of any of the methods (e.g., of FIG. 5) discussed herein can be adapted, rearranged, expanded, omitted, combined, and/or modified in various ways without deviating from the scope of the present disclosure.

At (501), the method 500 can include receiving a first and second location associated with a vehicle service. For example, the user 101 can provide a vehicle service request to the operations computing system 120, and the operations computing system 120 can select the vehicle 104 to provide the requested vehicle service for the user 101. The vehicle computing system 102 can receive, from the operations computing system 120, data representing a starting location associated with the vehicle service. Additionally, or alternatively, the vehicle computing system 102 can receive, from the operations computing system 120, data representing an ending location associated with the vehicle service.

At (502), the method 500 can include travelling to the first location. For example, the vehicle computing system 102 can cause the vehicle 104 to travel in accordance with a first route that leads to the starting location. As described herein, the vehicle 104 can autonomously navigate along the first route (e.g., via the autonomy system 110) to arrive at the starting location (e.g., pick-up location).

At (503), the method 500 can include providing limited control to a user associated with the vehicle service. For example, the vehicle computing system 100 into can provide a control of the vehicle 104 to the user 101 associated with the vehicle service. In some implementations, the vehicle computing system 102 can provide the control of the vehicle 104 when the vehicle 104 is at the starting location.

At (504), the method 500 can include identifying one or more release signals. For example, the vehicle computing system 102 can identify one or more release signals indicative of one or more actions of the user 101. The vehicle computing system 102 can identify the release signals by obtaining sensor data 109 indicative of an interior environment of the vehicle 104, and obtaining sensor data 109 indicative of an exterior environment of the vehicle 104. The vehicle computing system 102 can identify the release signals based at least in part on the sensor data 109.

At (505), the method 500 can include generating release signal data. For example, the vehicle computing system 102 can analyze the release signals to generate release signal data 270 indicative of when the vehicle service is complete.

At (506), the method 500 can include travelling to the second location. For example, the vehicle computing system 102 can cause the vehicle 104 to travel in accordance with a second route that leads to the ending location.

At (507), the method 500 can include determining that the vehicle service is complete. For example, the vehicle computing system 102 can determine that the vehicle service is complete when the vehicle 104 is at the ending location. In some implementations, the vehicle computing system 102 can assign a weight to each of the identified release signals. The vehicle computing system 102 can determine a confidence score based on the release signals and the assigned weights. The vehicle computing system 102 can determine that the vehicle service is complete when the confidence score is greater than a threshold value, and release control of the vehicle 104 from the user 101.

As another example, the vehicle computing system 102 can receive, from a remote computing system 103, an instruction to release control from the user 101. When the vehicle computing system 102 receives the instruction to release control, the vehicle computing system 102 can determine that the vehicle service is complete, and release control of the vehicle 104 from the user 101 in response to the instruction.

In some implementations, the vehicle computing system 102 can receive the instruction from the operations computing system 120 and/or the user computing system 122. Additionally, or alternatively, in some implementations, the vehicle computing system 102 can send a request to the user 101 (e.g., via the user computing system 122) to release control over the vehicle 104. The vehicle computing system 102 can receive the instruction to release control from the user 101 (e.g., via the user computing system 122). For instance, the user 101 can provide user input to a user interface displayed via a display device of the user computing system 122. The user input can indicate that the vehicle 104 should release the user 101, that the user 101 releases the vehicle 104, the vehicle service is complete, etc. Release signal data can be generated based on such information.

At (508), the method 500 can include releasing control from the user. For example, when the vehicle computing system 102 can release control of the vehicle 104 from the user 101 based at least in part on the release signals. The vehicle computing system 102 can analyze the release signals to determine when the vehicle service is complete. When the vehicle computing system 102 determines that the vehicle service is complete, the vehicle computing system 102 can release control of the vehicle 104 from the user 101. After the vehicle computing system 102 releases control of the vehicle 104, the vehicle computing system 102 can cause the vehicle 104 to drive away.

Figure 6:
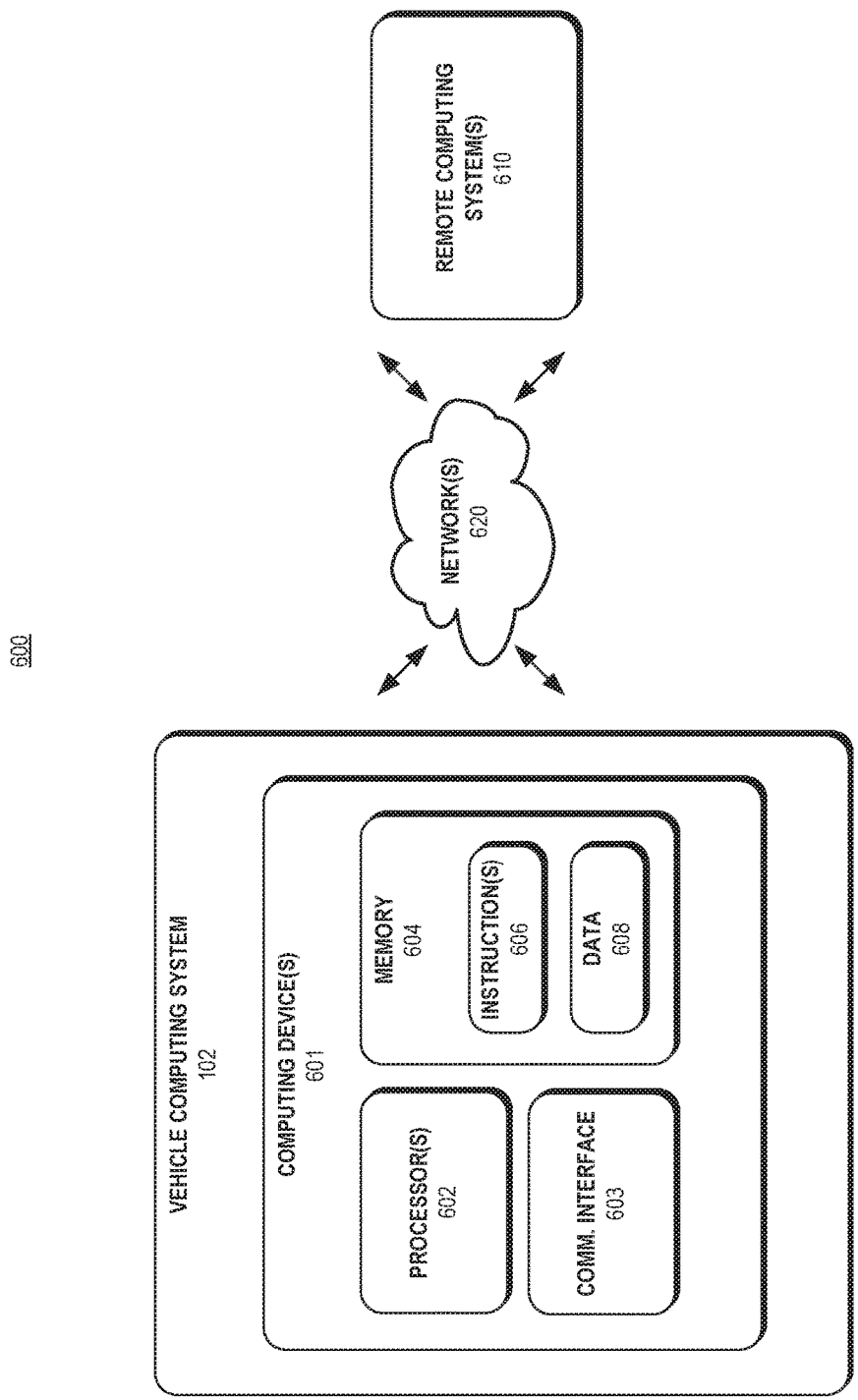
FIG. 6 depicts example system components according to example embodiments of the present disclosure.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 102 of the vehicle 104 and, in some implementations, remote computing system(s) 610 including one or more remote computing system(s) that are remote from the vehicle 104 (e.g., the operations computing system 120) that can be communicatively coupled to one another over one or more networks 620. The remote computing system 610 can be associated with a central operations system and/or an entity associated with the vehicle 104 such as, for example, a vehicle owner, vehicle manager, fleet operator, service provider, etc.

The computing device(s) 601 of the vehicle computing system 102 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 104 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 104 can store instructions 606 that when executed by the one or more processors 602 on-board the vehicle 104 cause the one or more processors 602 (the vehicle computing system 102) to perform operations such as any of the operations and functions of the vehicle computing system 102, as described herein, one or more operations of method 600, and/or any other operations and functions of the vehicle computing system 102, as described herein.

The memory 604 can store data 608 that can be obtained, received, accessed, written, manipulated, created, and/or stored. The data 608 can include, for instance, data associated with perception, prediction, motion plan, maps, vehicle service request(s), locations (e.g., starting location, ending location, etc.), release signal(s), and/or other data/information as described herein. In some implementations, the computing device(s) 601 can obtain data from one or more memory device(s) that are remote from the vehicle 104.

The computing device(s) 601 can also include a communication interface 603 used to communicate with one or more other system(s) on-board the vehicle 104 and/or a remote computing device that is remote from the vehicle 104 (e.g., of remote computing system(s) 610). The communication interface 603 can include any circuits, components, software, etc. for communicating via one or more networks (e.g., 620). In some implementations, the communication interface 603 can include, for example, one or more of a communications controller, receiver, transceiver, transmitter, port, conductors, software, and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 102. The remote computing devices can include components (e.g., processor(s), memory, instructions, data) similar to that described herein for the computing device(s) 601. Moreover, the remote computing system(s) 610 can be configured to perform one or more operations of the operations computing system 120, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for permitting access to an autonomous vehicle, the method comprising:
   communicating, by a computing system comprising one or more computing devices, with a user computing system of a user associated with a vehicle service to provide the user with access to enter and exit the autonomous vehicle;
   obtaining, by the computing system, interior sensor data indicative of an interior environment of the autonomous vehicle;
   identifying, by the computing system, one or more release signals indicative of one or more actions of the user based, at least in part, on the interior sensor data; and
   releasing, by the computing system, the access of the user to the autonomous vehicle from the user, based at least in part on the one or more release signals.

2. The computer-implemented method of claim 1, further comprising:
   receiving, by the computing system, data representing a starting location associated with the vehicle service;
   causing, by the computing system, the autonomous vehicle to travel in accordance with a first route that leads to the starting location; and
   communicating, by a computing system, with the user computing system to provide the user with access to enter and exit the autonomous vehicle when the autonomous vehicle is at the starting location.

3. The computer-implemented method of claim 1, further comprising:
   receiving, by the computing system, data representing an ending location associated with the vehicle service;
   causing, by the computing system, the autonomous vehicle to travel in accordance with a second route that leads to the ending location; and
   releasing, by the computing system, the access of the user to the autonomous vehicle from the user to the autonomous vehicle from the user when the vehicle is at the ending location.

4. The computer-implemented method of claim 1, wherein identifying the one or more release signals comprises:

obtaining, by the computing system, exterior sensor data indicative of an exterior environment of the autonomous vehicle; and identifying, by the computing system, the one or more release signals based at least in part on the exterior sensor data.

5. The computer-implemented method of claim 1, wherein releasing the access of the user to the autonomous vehicle from the user comprises:

assigning, by the computing system, a weight to each of the one or more release signals;

determining, by the computing system, a confidence score based on the one or more release signals and the assigned weights; and releasing, by the computing system, the access of the user to the autonomous vehicle from the user when the confidence score is greater than a threshold value.

6. The computer-implemented method of claim 1, wherein releasing the access of the user to the autonomous vehicle from the user comprises:

receiving, by the computing system, an instruction to release the access of the user to the autonomous vehicle; and releasing, by the computing system, the access of the user to the autonomous vehicle in response to the instruction.

7. The computer-implemented method of claim 6, wherein receiving an instruction to release the access of the user to the autonomous vehicle comprises:

sending, by the computing system, a request to the user to release the access of the user to the autonomous vehicle; and receiving, by the computing system, the instruction from the user.

8. The computer-implemented method of claim 1, wherein the interior sensor data indicative of the interior environment of the autonomous vehicle comprises at least one of image data or motion capture data indicative of the user exiting the autonomous vehicle.

9. The computer-implemented method of claim 1, wherein communicating, by the computing system, with the user computing system of the user comprises communicating with the user computing system to allow the user to adjust a climate control setting of the autonomous vehicle.

10. The computer-implemented method of claim 1, wherein communicating, by the computing system, with the user computing system of the user comprises communicating with the user computing system to allow the user to change a destination associated with the vehicle service to which the autonomous vehicle autonomously travels.

11. A computing system for permitting access to an autonomous vehicle, the system comprising:

one or more processors; and one or more tangible, non-transitory, computer readable media that collectively store instructions that when executed by the one or more processors cause the computing system to perform operations, the operations comprising:

communicating with a user computing system of a user associated with a vehicle service to provide the user with access to enter and exit the autonomous vehicle;

obtaining interior sensor data indicative of an interior environment of the autonomous vehicle;

identifying one or more release signals indicative of one or more actions of the user based, at least in part, on the interior sensor data; and releasing the access of the user to the autonomous vehicle from the user, based at least in part on the one or more release signals.

12. The computing system of claim 11, wherein the operations further comprise:

receiving data representing a starting location associated with the vehicle service;

causing the autonomous vehicle to travel in accordance with a first route that leads to the starting location; and communicating with the user computing system to provide the user with access to enter and exit the autonomous vehicle when the autonomous vehicle is at the starting location.

13. The computing system of claim 11, wherein the operations further comprise:

receiving data representing an ending location associated with the vehicle service;

causing the autonomous vehicle to travel in accordance with a second route that leads to the ending location; and releasing the access of the user to the autonomous vehicle from the user when the vehicle is at the ending location.

14. The computing system of claim 11, wherein determining the one or more release signals comprises:

obtaining exterior sensor data indicative of an exterior environment of the autonomous vehicle; and identifying the one or more release signals based at least in part on the exterior sensor data.

15. The computing system of claim 11, wherein releasing the access of the user to the autonomous vehicle from the user comprises:

assigning a weight to each of the one or more release signals;

determining a confidence score based on the one or more release signals and the assigned weights; and releasing the access of the user to the autonomous vehicle from the user if the confidence score is greater than a threshold value.

16. The computing system of claim 11, wherein releasing the access of the user to the autonomous vehicle from the user comprises:

receiving an instruction to release the access of the user to the autonomous vehicle; and releasing the access of the user to the autonomous vehicle in response to the instruction.

17. An autonomous vehicle, comprising:

one or more processors; and one or more tangible, non-transitory, computer readable media that collectively store instructions that when executed by the one or more processors cause the autonomous vehicle to perform operations, the operations comprising:

communicating with a user computing system of a user associated with a vehicle service to provide the user with access to enter and exit the autonomous vehicle;

obtaining interior sensor data indicative of an interior environment of the autonomous vehicle;

identifying one or more release signals indicative of one or more actions of the user based, at least in part, on the interior sensor data; and releasing the access of the user to the autonomous vehicle from the user, based at least in part on the one or more release signals.

18. The autonomous vehicle of claim 17, wherein the operations further comprise:

receiving data representing a starting location associated with the vehicle service;

causing the autonomous vehicle to travel in accordance with a first route that leads to the starting location; and communicating with the user computing system to provide the user with access to enter and exit the autonomous vehicle when the autonomous vehicle is at the starting location.

19. The autonomous vehicle of claim 17, wherein the operations further comprise:

receiving data representing an ending location associated with the vehicle service;

causing the autonomous vehicle to travel in accordance with a second route that leads to the ending location; and releasing the access of the user to the autonomous vehicle from the user when the vehicle is at the ending location.

20. The autonomous vehicle of claim 17, wherein determining the one or more release signals comprises:

obtaining exterior sensor data indicative of an exterior environment of the autonomous vehicle; and identifying the one or more release signals based at least in part on the exterior sensor data.

21. The autonomous vehicle of claim 17, wherein releasing the access of the user to the autonomous vehicle from the user comprises:

assigning a weight to each of the one or more release signals;

determining a confidence score based on the one or more release signals and the assigned weights; and releasing the access of the user to the autonomous vehicle from the user if the confidence score is greater than a threshold value.

22. The autonomous vehicle of claim 17, wherein releasing the access of the user to the autonomous vehicle from the user comprises:

receiving an instruction to release the access of the user to the autonomous vehicle; and releasing the access of the user to the autonomous vehicle in response to the instruction.

* * * * *